United States Patent
Shi et al.

(10) Patent No.: US 11,234,250 B2
(45) Date of Patent: Jan. 25, 2022

(54) UPLINK DATA TRANSMISSION METHOD AND APPARATUS FOR LATENCY REDUCTION AND COMMUNICATIONS SYSTEM

(71) Applicant: FUJITSU LIMITED, Kawasaki (JP)

(72) Inventors: Yulong Shi, Beijing (CN); Haibo Xu, Beijing (CN)

(73) Assignee: FUJITSU LIMITED, Kawasaki (JP)

(*) Notice: Subject to any disclaimer, the term of this patent is extended or adjusted under 35 U.S.C. 154(b) by 67 days.

(21) Appl. No.: 15/948,562

(22) Filed: Apr. 9, 2018

(65) Prior Publication Data
US 2018/0234992 A1    Aug. 16, 2018

Related U.S. Application Data

(63) Continuation of application No. PCT/CN2015/092845, filed on Oct. 26, 2015.

(51) Int. Cl.
*H04W 72/12* (2009.01)
*H04W 72/04* (2009.01)

(52) U.S. Cl.
CPC ........... *H04W 72/12* (2013.01); *H04W 72/04* (2013.01); *H04W 72/042* (2013.01)

(58) Field of Classification Search
CPC ............................ H04W 72/12; H04W 72/042
See application file for complete search history.

(56) References Cited

U.S. PATENT DOCUMENTS

| | | | | |
|---|---|---|---|---|
| 2008/0225783 A1* | 9/2008 | Wang | ................. | H04W 72/042 370/329 |
| 2009/0197610 A1* | 8/2009 | Chun | ................. | H04W 72/1284 455/450 |
| 2010/0113058 A1* | 5/2010 | Wu | ................. | H04W 72/02 455/452.1 |
| 2011/0032895 A1 | 2/2011 | Englund et al. | | |

(Continued)

FOREIGN PATENT DOCUMENTS

| | | |
|---|---|---|
| CN | 102907014 A | 1/2013 |
| CN | 103733711 A | 4/2014 |

(Continued)

OTHER PUBLICATIONS

International Search Report issued for corresponding International Patent Application No. PCT/CN2015/092845 and dated Jul. 19, 2016. English translation attached.

Written Opinion of the International Searching Authority issued for corresponding International Patent Application No. PCT/CN2015/092845 and dated Jul. 19, 2016. English translation attached.

(Continued)

*Primary Examiner* — Hassan Kizou
*Assistant Examiner* — Hector Reyes
(74) *Attorney, Agent, or Firm* — Myers Wolin, LLC

(57) ABSTRACT

An uplink data transmission method and apparatus for latency reduction and a communications system. The uplink data transmission method includes: receiving resource indication information transmitted by a base station; the resource indication information indicating availability of using the semi-persistent resources at one or more TTIs or subframes by the first UE; determining a transmission resource from the semi-persistent resources according to the resource indication information when uplink data is needed to be transmitted; and transmitting the uplink data by using the transmission resource. Hence, not only latency of the (Continued)

uplink data may be reduced outstandingly, but also the semi-persistent resources may be allocated to other UEs with no waste of semi-persistent resources as much as possible, thereby improving resource utilization efficiency and transmission latency performance of the UE.

19 Claims, 11 Drawing Sheets

(56) References Cited

U.S. PATENT DOCUMENTS

| | | | |
|---|---|---|---|
| 2011/0280202 A1 | 11/2011 | Lee et al. | |
| 2012/0069805 A1* | 3/2012 | Feuersanger | H04W 72/1284 370/329 |
| 2012/0155416 A1* | 6/2012 | Zhang | H04W 72/04 370/329 |
| 2014/0105164 A1 | 4/2014 | Moulsley et al. | |
| 2015/0282148 A1* | 10/2015 | Le | H04W 72/0406 370/329 |
| 2016/0183241 A1* | 6/2016 | Lee | H04W 56/0015 455/425 |
| 2016/0211950 A1* | 7/2016 | Cheng | H04W 72/0413 |
| 2016/0227517 A1 | 8/2016 | Han | |
| 2017/0026942 A1* | 1/2017 | Vajapeyam | H04W 4/70 |
| 2017/0094676 A1* | 3/2017 | Kim | H04W 72/1205 |

FOREIGN PATENT DOCUMENTS

| | | |
|---|---|---|
| CN | 104756571 A | 7/2015 |
| WO | 2009079365 A2 | 6/2009 |
| WO | 2010/081166 A2 | 7/2010 |
| WO | 2015/051504 A1 | 4/2015 |

OTHER PUBLICATIONS

ETRI; "Further Discussion on SPS with Consideration to Resource Efficiency", Agenda Item: 7.10, 3GPP TSG-RAN WG2 Meeting #91bis, R2-154554, Malmö, Sweden, Oct. 5 9, 2015.

CMCC; "Potential issues on enhanced SPS mechanism", Agenda Item: 7.10.1, 3GPP TSG-RAN WG2 Meeting #91 bis, R2-154142, Malmö, Sweden, Oct. 5-9, 2015.

Fujitsu; "Considerations on the SPS resource efficiency", Agenda Item: 8.8.2, 3GPP TSG-RAN WG2 Meeting #94, R2-163771, Nanjing, China, May 23-27, 2016.

First Notification of Office Action and Search Report issued by the China National Intellectual Property Administration for corresponding Chinese Patent Application No. 201580083083.8, dated Jun. 17, 2021, with an English translation.

* cited by examiner

UPLINK DATA TRANSMISSION METHOD AND APPARATUS FOR LATENCY REDUCTION AND COMMUNICATIONS SYSTEM

CROSS REFERENCE TO RELATED APPLICATIONS

This application is a continuation application of International Application PCT/CN2015/092845 filed on Oct. 26, 2015, the entire contents of which are incorporated herein by reference.

TECHNICAL FIELD

This disclosure relates to the field of communications technologies, and in particular to an uplink data transmission method and apparatus for latency reduction and a communications system in a long-term evolution (LTE) system.

BACKGROUND

Real-time traffics, such as automatic driving, and industrial automatic control, etc., that will be carried out in a next-generation mobile communications network, have a very high requirement on transmission latency, such as requiring that peer-to-peer latency is between 1-10 ms. When such traffics are carried by an LTE system, a relatively large challenge will be brought about to latency performance of the network. And furthermore, for a legacy transmission control protocol (TCP) traffic, reduction of peer-to-peer latency may greatly improve throughput of the system. Considering from the two aspects, it is urgently needed to lower the peer-to-peer latency of the LTE system.

In a legacy uplink data transmission scheme, when a user equipment (UE) has arrived uplink data, the UE first transmits a scheduling request (SR) to a base station (such as an eNB), receives an uplink resource grant transmitted by the base station after three transmission time intervals (TTIs), and transmits uplink data at a resource position indicated by the uplink resource grant after three TTIs. This procedure is a legacy SR procedure, which will bring relatively large latency (it is generally deemed that average latency is 9.5 TTIs) to the uplink data of the UE.

A method for pre-allocating resources to reduce latency of the UE in transmitting uplink data is under study in the 3rd generation partnership project (3GPP). It has been agreed in 3GPP to support a semi-persistent scheduling (SPS) mechanism with one TTI as a period to reduce the latency of the uplink data of the UE.

In the SPS mechanism, the base station configures the UE with periodic uplink resources in advance, and the UE may autonomously transmit uplink data on the configured SPS resources, without needing a procedure of transmitting an SR. In this way, latency of transmission of the uplink data may be greatly reduced.

Taking SPS with a period of one TTI as an example, the latency of transmission of the uplink data by the UE only includes latency of data processing of the UE. And at the same time, in order to lower power consumption of the UE in transmission, 3GPP allows that the UE does not transmit uplink data at a TTI having no uplink data, no matter whether the TTI is configured with SPS resources (hereinafter referred to as semi-persistent resources in brief) or dynamically allocated uplink resources, that is, the UE may jump over the uplink resources configured by the base station. In this way, latency of transmission of the UE may be efficiently reduced, and at the same time, may lower power consumption in transmission and uplink data interference of the UE.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

However, it was found by the inventors that although the SPS mechanism with a period of one TTI may reduce latency of transmission of uplink data of a part of UEs to the minimum, it causes waste of radio resources. After some resource blocks (RBs) are allocated for a UE as semi-persistent resources, even though the UE has no data for transmission, these resources are exclusively occupied by the UE, and will not be allocated to other UEs for use. When the UE has no data for transmission within a relatively long period of time, it will jump over these semi-persistent resources, thereby resulting in waste of radio resources. When the number of UEs configured with semi-persistent resources in a network is relatively large, waste of resources will be very severe.

In order to improve utilization of radio resources, a scheme of sharing semi-persistent resources by multiple UEs is discussed in 3GPP. In the scheme, it is allowed that identical semi-persistent resources are configured for multiple UEs, and the multiple UEs use the semi-persistent resources in a contention-based manner. When transmission of data of the UE is not frequent, such a scheme may improve utilization of radio resources. However, when the transmission of data of the UE is relatively frequent, collision between the multiple UEs may occur at positions of the identical semi-persistent resources, which will result in uplink interference. And at this moment, latency performance and throughput performance will be degraded outstandingly.

Embodiments of this disclosure provide an uplink data transmission method and apparatus for latency reduction and a communications system, by which it is expected that latency of uplink data is outstandingly shortened and system performance is improved, without wasting semi-persistent resources as much as possible.

According to a first aspect of the embodiments of this disclosure, there is provided an uplink data transmission method for latency reduction, applicable to a first UE; the first UE is preconfigured with semi-persistent resources for transmitting uplink data, and the uplink data transmission method includes:

receiving resource indication information transmitted by a base station; the resource indication information indicating availability of using the semi-persistent resources at one or more transmission time intervals (TTIs) or subframes by the first UE;

determining a transmission resource from the semi-persistent resources according to the resource indication information when uplink data is needed to be transmitted; and transmitting the uplink data by using the transmission resource at a TTI or a subframe corresponding to the transmission resource.

According to a second aspect of the embodiments of this disclosure, there is provided an uplink data transmission apparatus for latency reduction, configured in a first UE; the first UE is preconfigured with semi-persistent resources for transmitting uplink data, and the uplink data transmission apparatus includes:

an indication receiving unit configured to receive resource indication information transmitted by a base station; the resource indication information indicating availability of using the semi-persistent resources at one or more transmission time intervals (TTIs) or subframes by the first UE;

a resource determining unit configured to determine a transmission resource from the semi-persistent resources according to the resource indication information when uplink data is needed to be transmitted; and a data transmitting unit configured to transmit the uplink data by using the transmission resource at a TTI or a subframe corresponding to the transmission resource.

According to a third aspect of the embodiments of this disclosure, there is provided an uplink data transmission method for latency reduction, applicable to a base station, the uplink data transmission method including:

configuring a first UE with semi-persistent resources for transmitting uplink data;

transmitting resource indication information to the first UE; the resource indication information indicating availability of using the semi-persistent resources at one or more TTIs or subframes by the first UE; and receiving uplink data transmitted by the first UE.

According to a fourth aspect of the embodiments of this disclosure, there is provided an uplink data transmission apparatus for latency reduction, configured in a base station, the uplink data transmission apparatus including:

a configuring unit configured to configure a first UE with semi-persistent resources for transmitting uplink data;

an indication transmitting unit configured to transmit resource indication information to the first UE; the resource indication information indicating availability of using the semi-persistent resources at one or more TTIs or subframes by the first UE; and a data receiving unit configured to receive uplink data transmitted by the first UE.

According to a fifth aspect of the embodiments of this disclosure, there is provided a communications system, including:

a base station configured to preconfigure a first UE with semi-persistent resources for transmitting uplink data, transmit resource indication information to the first UE, the resource indication information indicating availability of using the semi-persistent resources at one or more TTIs or subframes by the first UE, and receive uplink data transmitted by the first UE; and the first UE configured to determine a transmission resource from the semi-persistent resources according to the resource indication information when uplink data is needed to be transmitted, and transmit the uplink data by using the transmission resource at a TTI or a subframe corresponding to the transmission resource.

According to another aspect of the embodiments of this disclosure, there is provided a computer readable program, which, when executed in a UE, will cause a computer unit to carry out the uplink data transmission method for latency reduction as described above in the UE.

According to a further aspect of the embodiments of this disclosure, there is provided a computer storage medium, including a computer readable program, which will cause a computer unit to carry out the uplink data transmission method for latency reduction as described above in a UE.

According to still another aspect of the embodiments of this disclosure, there is provided a computer readable program, which, when executed in a base station, will cause a computer unit to carry out the uplink data transmission method for latency reduction as described above in the base station.

According to yet another aspect of the embodiments of this disclosure, there is provided a computer storage medium, including a computer readable program code, which will cause a computer unit to carry out the uplink data transmission method for latency reduction as described above in a base station.

An advantage of the embodiments of this disclosure exists in that the UE receives the resource indication information indicating availability of using the semi-persistent resources transmitted by the base station, and transmits uplink data by using available resources when the uplink data need to be transmitted and there exist the available resources. Hence, not only latency of the uplink data may be reduced outstandingly, but also the semi-persistent resources may be allocated to other UEs with no waste of semi-persistent resources as much as possible, thereby improving resource utilization efficiency and transmission latency performance of the UE.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of this disclosure. To facilitate illustrating and describing some parts of the disclosure, corresponding portions of the drawings may be exaggerated or reduced.

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

DETAILED DESCRIPTION

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

Embodiment 1

The embodiment of this disclosure provides an uplink data transmission method for latency reduction; a first UE is preconfigured with semi-persistent resources for transmitting uplink data, and one or more of the semi-persistent resources allocated for the first UE may possibly allocated for a second UE for use.

Figure 1:
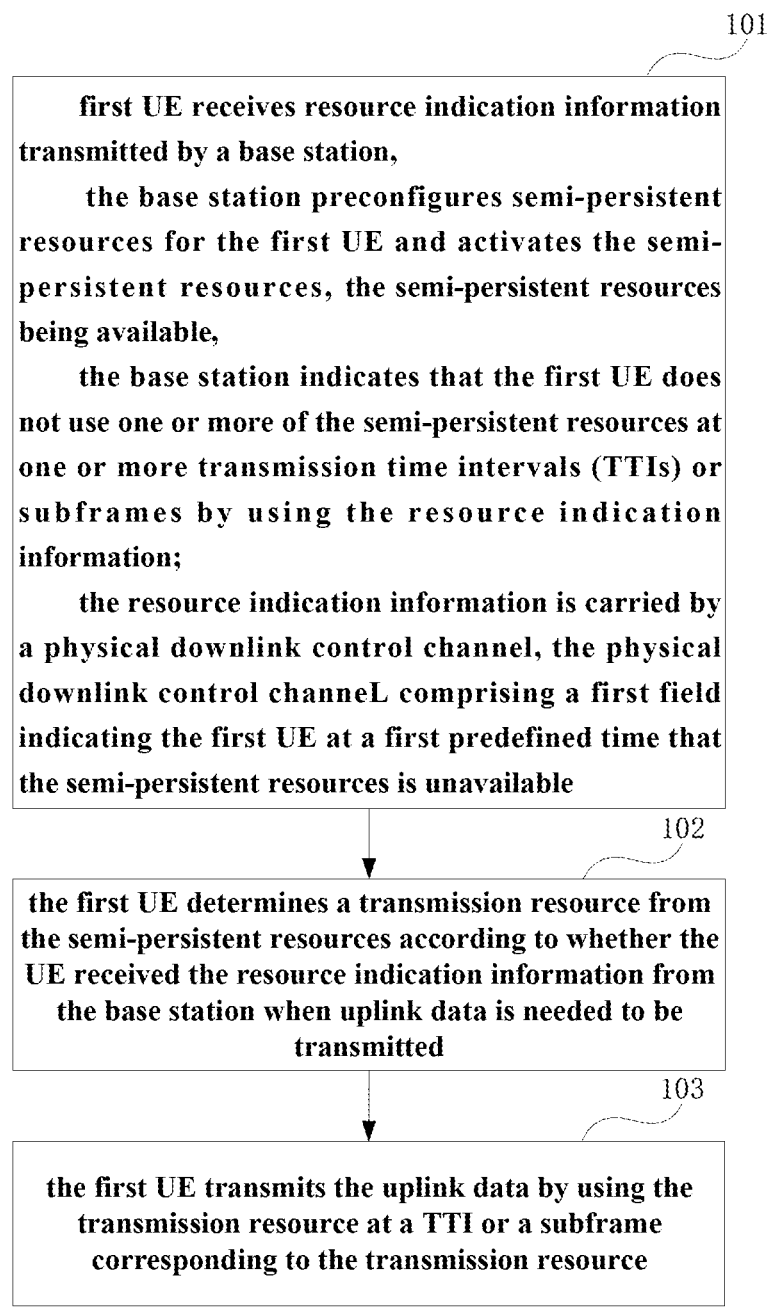
FIG. 1 is a flowchart of the uplink data transmission method for latency reduction of Embodiment 1 of this disclosure.

FIG. 1 is a flowchart of the uplink data transmission method for latency reduction of the embodiment of this disclosure, which shall be described from a first UE side. As shown in FIG. 1, the uplink data transmission method includes:

Block 101: the first UE receives resource indication information transmitted by a base station; the resource indication information indicating availability of using the semi-persistent resources at one or more TTIs or subframes by the first UE;

Block 102: the first UE determines a transmission resource from the semi-persistent resources according to the resource indication information when uplink data is needed to be transmitted; and Block 103: the first UE transmits the uplink data by using the transmission resource at a TTI or a subframe corresponding to the transmission resource.

In this embodiment, the base station may preconfigure the semi-persistent resources for the first UE (such as the UE 1 having a relatively high requirement on latency) and activate the semi-persistent resources; and thereafter, the semi-persistent resources having been configured for the UE 1 may still be allocated for a second UE (such as the UE 2 having no high requirement on latency) by the base station.

For example, the semi-persistent resources may be preconfigured as being unavailable, that is, the semi-persistent resources configured by the base station default to be unavailable uplink grants (which may be determined by the base station according to a current network condition; for example, when a network payload is relatively heavy, the preconfigured semi-persistent resources default to be unavailable). Thereafter, the base station indicates that the UE 1 may use one or more semi-persistent resources by using the resource indication information.

In such a case, if semi-persistent resources at a TTI are not allocated for the UE 2 for use, the base station will notify the UE 1 that it may use the semi-persistent resources at the TTI. For example, the base station may notify the UE 1 of availability of the semi-persistent resources in multiple ways, such as notifying one time at each TTI, or notifying one time in a manner of binding multiple TTIs. For example, the resource indication information is carried in a physical downlink control channel (PDCCH) and is periodically transmitted to the UE 1.

Alternatively, the semi-persistent resources may be preconfigured as being available, that is, the semi-persistent resources configured by the base station default to be available uplink grants (which may be determined by the base station according to a current network condition; for example, when a network payload is relatively light, the preconfigured semi-persistent resources default to be available). Thereafter, the base station indicates that the UE 1 may not use one or more semi-persistent resources by using the resource indication information.

In such a case, if semi-persistent resources at a TTI are allocated for the UE 2 for use, the base station will notify the UE 1 that it may not use the semi-persistent resources at the TTI. For example, the base station may notify the UE 1 of availability of the semi-persistent resources in multiple ways, such as notifying one time at each TTI, or notifying one time in a manner of binding multiple TTIs. For example, the resource indication information is carried in a PDCCH and is periodically transmitted to the UE 1.

In this embodiment, during a period when the UE 1 has no uplink data for transmission, the semi-persistent resources of the UE 1 may be allocated for other UEs (such as the UE 2) for use, thereby reducing waste of resources. And whether the preconfigured semi-persistent resources have been allocated by the base station for the UE 2 for use needs to be notified explicitly or implicitly by the base station to the UE 1.

Furthermore, when the UE 1 has arrived new uplink data, if the UE 1 has no available semi-persistent resource, disabling the UE 2 to transmit uplink data at a certain moment (such as the next TTI) needs to be notified explicitly or implicitly by the base station to the UE 2, that is, the uplink data is returned to the UE 1 for use, and the UE 1 can transmit uplink data at that moment.

Figure 2:
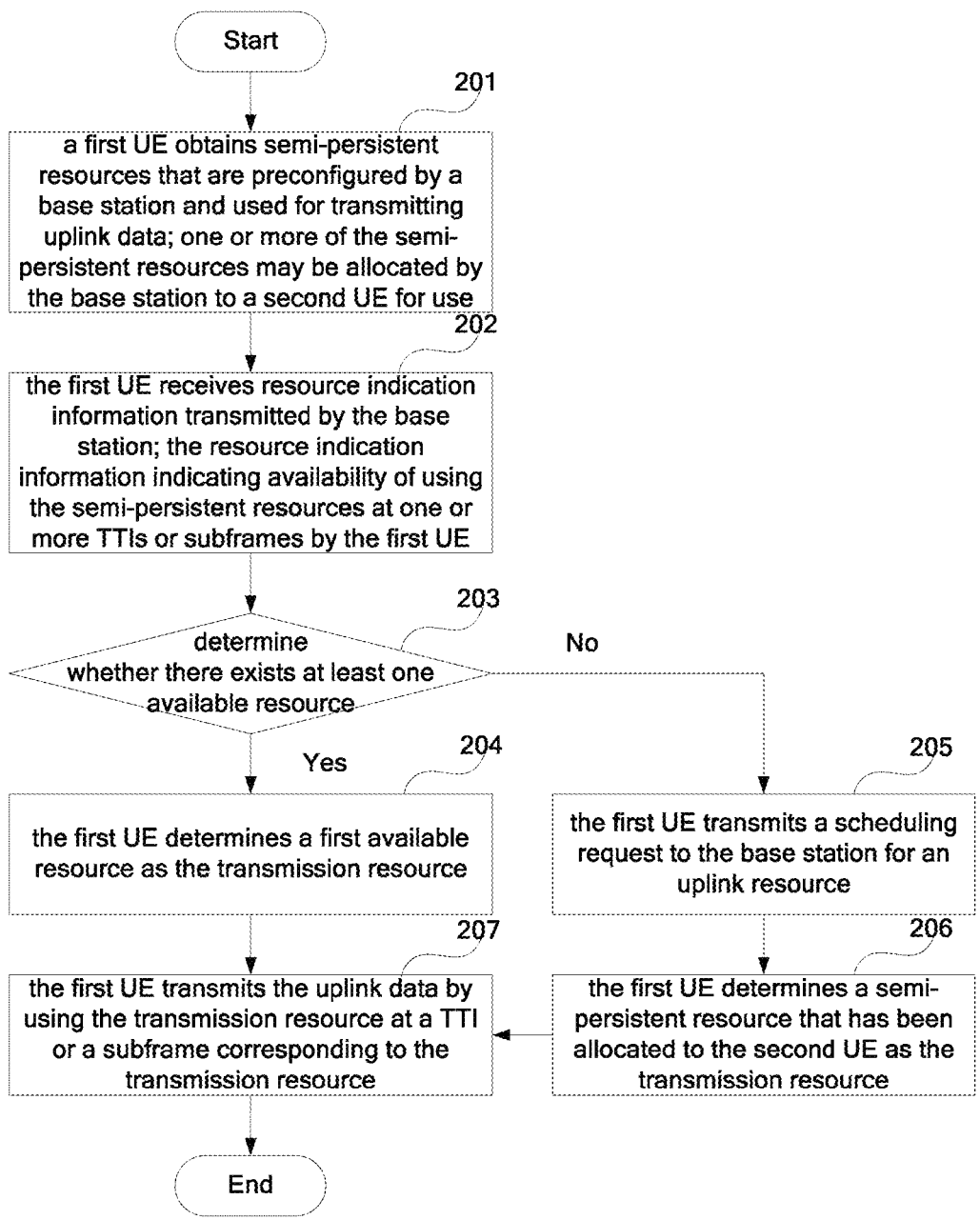
FIG. 2 is another flowchart of the uplink data transmission method for latency reduction of Embodiment 1 of this disclosure.

FIG. 2 is another flowchart of the uplink data transmission method for latency reduction of the embodiment of this disclosure. As shown in FIG. 2, the uplink data transmission method includes:

Block 201: the first UE obtains semi-persistent resources that are preconfigured by the base station and used for transmitting uplink data; one or more of the semi-persistent resources may be allocated by the base station to the second UE for use.

Block 202: the first UE receives the resource indication information transmitted by the base station; the resource indication information indicating availability of using the semi-persistent resources at one or more TTIs or subframes by the first UE.

Block 203: the first UE determines whether there exists at least one available resource in the semi-persistent resources according to the resource indication information when it needs to transmit uplink data, and block 204 is executed when there exists an available resource, and block 205 is executed when there exists no available resource.

Block 204: the first UE determines a first available resource as the transmission resource.

Block 205: the first UE transmits a scheduling request to the base station for an uplink resource.

Block 206: the first UE determines a semi-persistent resource that has been allocated to the second UE as the transmission resource.

In this embodiment, the semi-persistent resource that has been allocated to the second UE may be determined by a time needed by the base station in receiving the scheduling request and disabling the second UE to use the semi-persistent resource; for example, the semi-persistent resource may be a semi-persistent resource to which a fifth subframe or a fifth TTI after transmitting the scheduling request corresponds.

As shown in FIG. 2, the method further includes:

Block 207: the first UE transmits the uplink data by using the transmission resource at a TTI or a subframe corresponding to the transmission resource.

It should be noted that FIG. 2 is described by taking receiving a piece of resource indication information as an example. However, this disclosure is not limited thereto, and the base station may transmit resource indication information continuously, such as transmitting resource indication information to the UE 1 at each TTI by using PDCCHs.

Hence, the UE 1 may receive again the resource indication information while or after the SR is transmitted, and determine whether there exists an available resource again; the UE 1 may determine the first available resource as the transmission resource when there exists an available resource, as described in block 204; and may determine the semi-persistent resource that has been allocated to the second UE as the transmission resource when there exists no available resource, as described in block 206.

This disclosure is illustrated above from the first UE side. The first UE is preconfigured by the base station with the semi-persistent resources for transmitting uplink data, and one or more of the semi-persistent resources may possibly be allocated by the base station for the second UE for use. Hence, latency may be shortened with no need of an SR procedure.

Furthermore, the resource indication information in this disclosure can be used to dynamically indicate the availability of using the semi-persistent resources by the first UE on one or more subframes (or at one or more TTIs), thereby dynamically temporally allocating or recycling the semi-persistent resources, and improving utilization of the semi-persistent resources.

Interworking between the base station, the first UE and the second UE shall be illustrated below.

In this embodiment, description shall be given by taking that a period configured for the SPS is 1 TTI and a period configured for the SR is 1 TTI as examples; however, this disclosure is not limited thereto, and other periods of the SPS and the SR are also applicable. Furthermore, it is assumed in this embodiment that a length of a subframe is identical that of a TTI, for example, both of them are 1 ms; however, this disclosure is not limited thereto, for example, a length of a subframe may be different from that of a TTI.

Following description shall be given by taking that a length of a subframe is identical that of a TTI and both of them are 1 ms as an example.

Figure 3:
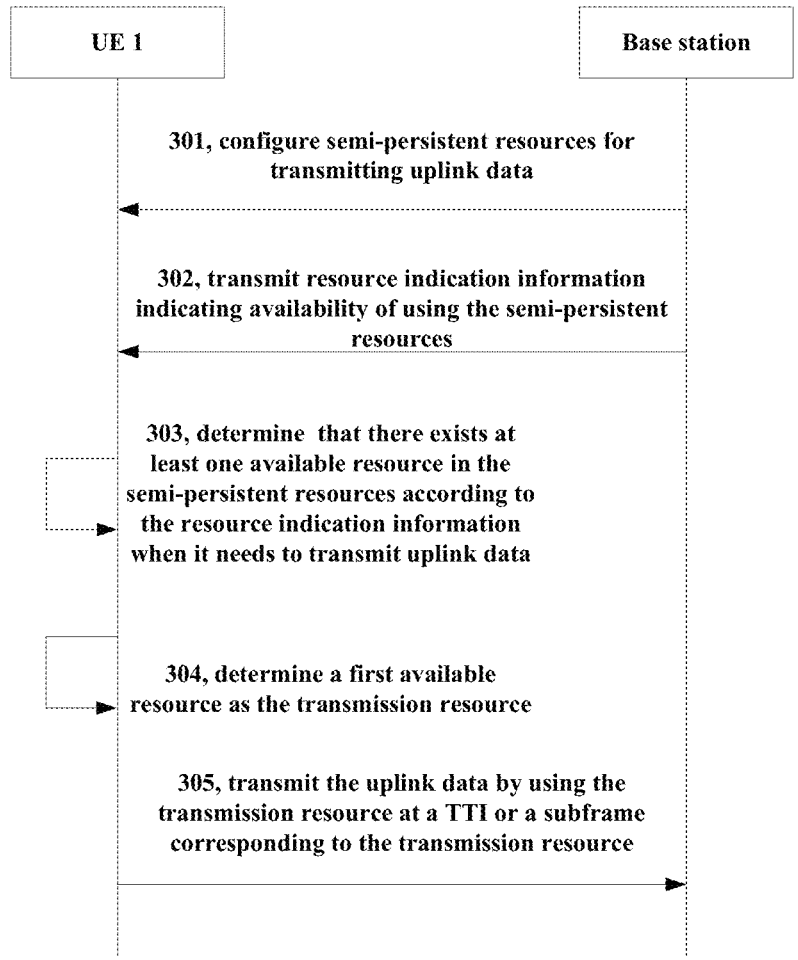
FIG. 3 is a further flowchart of the uplink data transmission method for latency reduction of Embodiment 1 of this disclosure.

FIG. 3 is a further flowchart of the uplink data transmission method for latency reduction of the embodiment of this disclosure, in which a case where a UE 1 has available resources is shown. As shown in FIG. 3, the uplink data transmission method includes:

Block 301: the base station preconfigures for the UE 1 with semi-persistent resources for transmitting uplink data;

in this embodiment, the base station may allocate one or more semi-persistent resources for a UE 2; of course, when it is not needed by the UE 2, the semi-persistent resources configured for the UE 1 may not be temporally allocated for the UE 2.

Block 302: the base station transmits resource indication information to the UE 1; the resource indication information indicating availability of using the semi-persistent resources at one or more TTIs or subframes by the UE 1.

For example, the base station may periodically or aperiodically transmit the resource indication information, such as carrying the resource indication information by using PDCCHs and transmitting the resource indication information at every TTI; however, this disclosure is not limited thereto.

Block 303: the UE 1 determines that there exists at least one available resource in the semi-persistent resources according to the resource indication information when it needs to transmit uplink data.

Block 304: the UE 1 determines a first available resource as the transmission resource.

Block 305: the UE 1 transmits the uplink data by using the transmission resource at a TTI or a subframe corresponding to the transmission resource.

Figure 4:
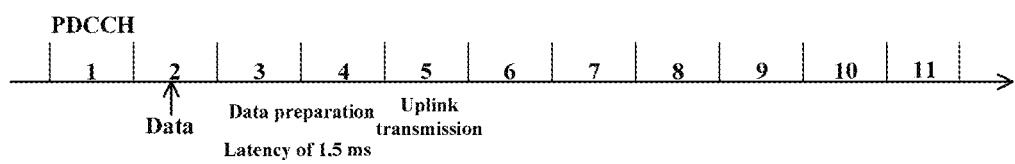
FIG. 4 is an exemplary diagram of receiving a PDCCH and transmitting uplink data of Embodiment 1 of this disclosure.

FIG. 4 is an exemplary diagram of receiving a PDCCH and transmitting the uplink data of the embodiment of this disclosure. As shown in FIG. 4, a UE 1 is preconfigured with the semi-persistent resources at each subframe (it may also be a TTI, and following description shall be given by taking a subframe as an example). Taking that uplink data arrives at an n-th subframe (n=2 as shown in FIG. 4) as an example, a PDCCH containing the resource indication information has been received at an (n−1)-th subframe, which indicates that there exist available semi-persistent resources at an (n+3)-th subframe, and the UE 1 may not transmit an SR at an (n+1)-th subframe, but may transmit uplink data at the (n+3)-th subframe.

That is, if the UE 1 learns before transmitting the SR (usually at the (n+1)-th subframe) via the indication of the base station that at least one available semi-persistent resource exists in a subsequent subframe (taking that processing latency of the UE is 1.5 ms as an example, it is usually an (n+3)-th subframe or an (n+4)-th subframe), the UE 1 will not transmit the SR, but will transmit the uplink data at a TTI of the first available semi-persistent resource (a fifth subframe shown in FIG. 4).

One time of transmission of a PDCCH is only illustrated in FIGS. 3 and 4. However, this disclosure is not limited thereto, and the base station may periodically transmit PDCCHs, such as transmitting one time at every TTI.

Figure 5:
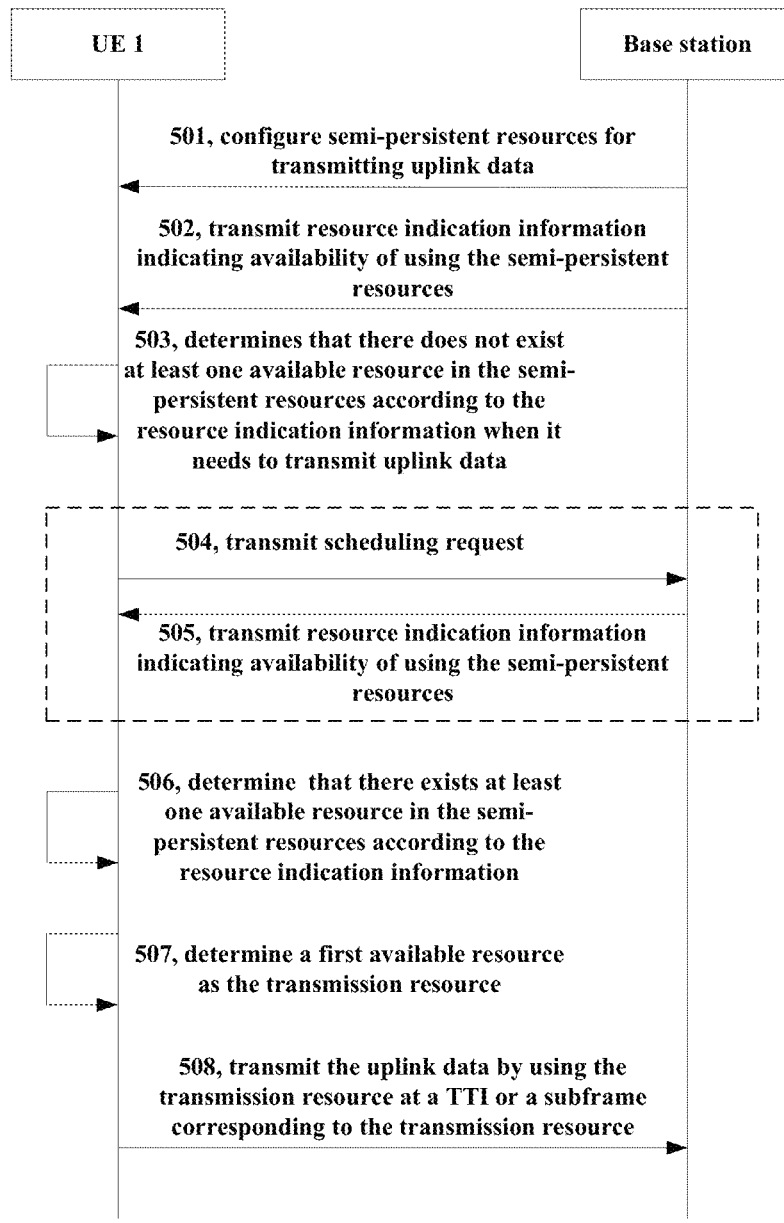
FIG. 5 is still another flowchart of the uplink data transmission method for latency reduction of Embodiment 1 of this disclosure.

FIG. 5 is still another flowchart of the uplink data transmission method for latency reduction of the embodiment of this disclosure, in which a case where a UE 1 transmits an SR and has available resources is shown. As shown in FIG. 5, the uplink data transmission method includes:

Block 501: the base station preconfigures for the UE 1 with semi-persistent resources for transmitting uplink data;

in this embodiment, the base station may allocate one or more semi-persistent resources for a UE 2 for use; of course, when it is not needed by UE 2, the semi-persistent resources configured for the UE 1 may not be temporally allocated for UE 2.

Block 502: the base station transmits resource indication information to the UE 1; the resource indication information indicating availability of using the semi-persistent resources at one or more TTIs or subframes by the UE 1.

For example, the base station may periodically or aperiodically transmit the resource indication information, such as carrying the resource indication information by using PDCCHs and transmitting the resource indication information at every TTI; however, this disclosure is not limited thereto.

Block 503: the UE 1 determines that there does not exist at least one available resource in the semi-persistent resources according to the resource indication information when it needs to transmit uplink data.

Block 504: the UE 1 transmits a scheduling request to the base station for an uplink resource.

Block 505: the UE 1 receives again the resource indication information while or after transmitting the scheduling request;

as shown in FIG. 5, in blocks 504 and 505 shown in FIG. 5, receiving the resource indication information and transmitting the SR may be performed on the same subframe or at the same TTI (such as in a duplex system).

Block 506: the UE 1 determines that there exists at least one available resource in the semi-persistent resources according to the resource indication information.

Block 507: the UE 1 determines a first available resource as the transmission resource.

Block 508: the UE 1 transmits the uplink data by using the transmission resource at a TTI or a subframe corresponding to the transmission resource.

Figure 6:
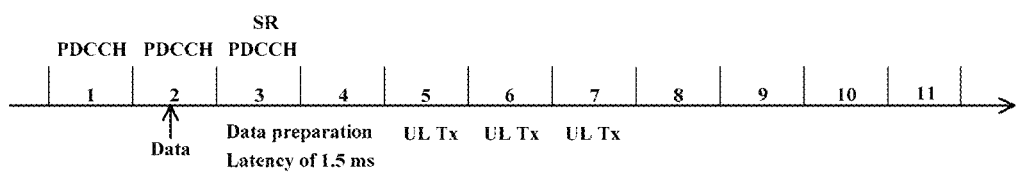
FIG. 6 is another exemplary diagram of receiving a PDCCH and transmitting uplink data of Embodiment 1 of this disclosure.

FIG. 6 is another exemplary diagram of receiving a PDCCH and transmitting uplink data of the embodiment of this disclosure. As shown in FIG. 6, a UE 1 is preconfigured with the semi-persistent resources at each subframe (it may also be a TTI, and following description shall be given by taking a subframe as an example), and receives PDCCHs containing the resource indication information at each subframe. Taking that uplink data arrives at an n-th subframe (n=2 as shown in FIG. 6) as an example, a PDCCH containing the resource indication information has been received at an (n−1)-th subframe, which indicates that there exists no available semi-persistent resource at an (n+3)-th subframe or an (n+4)-th subframe, and the UE 1 will transmit an SR at an (n+1)-th subframe.

Furthermore, if the UE 1 learns in or after transmitting the SR (usually at the (n+1)-th subframe) via the indication of the base station (such as a PDCCH received at the (n+1)-th subframe) that at least one available semi-persistent resource exists in a subsequent subframe (taking that processing latency of the UE is 1.5 ms as an example, it is usually an (n+4)-th subframe or an (n+5)-th subframe), the UE 1 will transmit the uplink data at a TTI of the first available semi-persistent resource.

Figure 7:
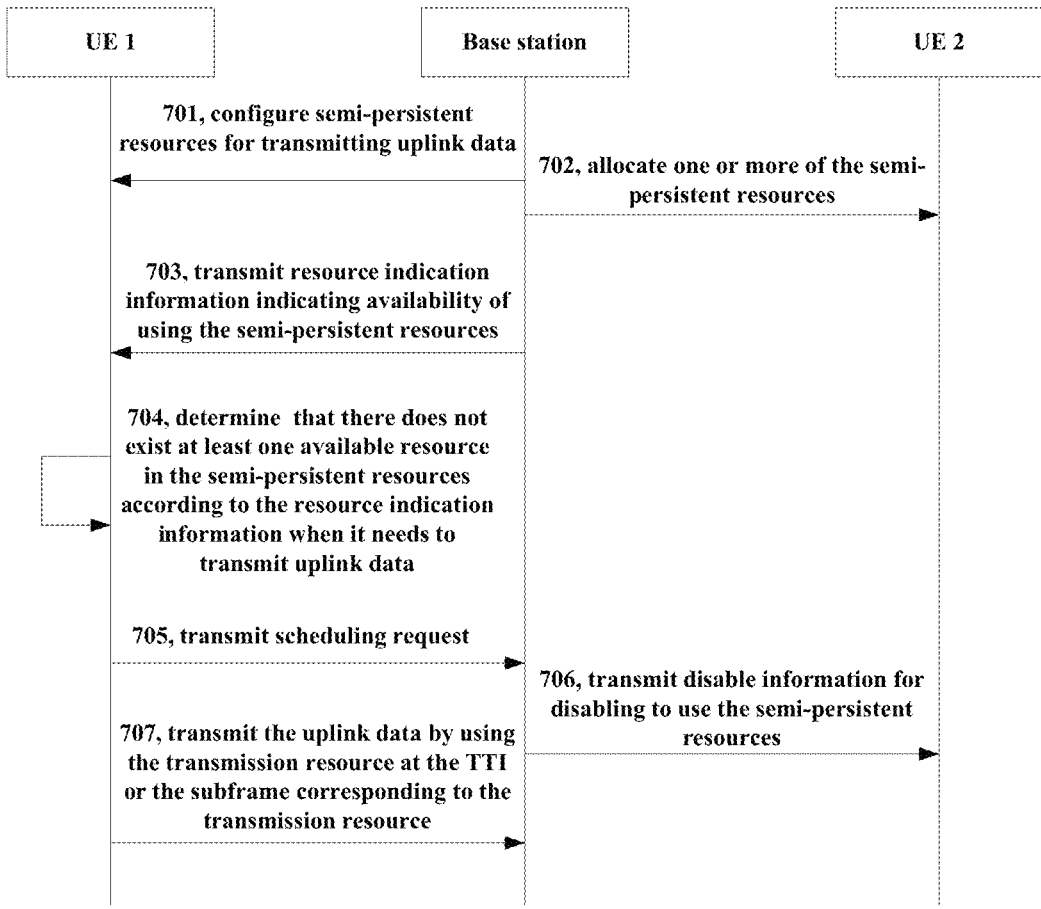
FIG. 7 is yet another flowchart of the uplink data transmission method for latency reduction of Embodiment 1 of this disclosure.

FIG. 7 is yet another flowchart of the uplink data transmission method for latency reduction of the embodiment of this disclosure. As shown in FIG. 7, the uplink data transmission method includes:

Block 701: the base station preconfigures for a UE 1 with semi-persistent resources for transmitting uplink data.

Block 702: the base station allocates one or more of the semi-persistent resources to a UE 2 for use.

Block 703: the base station transmits resource indication information to the UE 1; the resource indication information indicating availability of using the semi-persistent resources at one or more TTIs or subframes by the UE 1.

For example, the base station may periodically or aperiodically transmit the resource indication information, such as carrying the resource indication information by using PDCCHs and transmitting the resource indication information at every TTI; however, this disclosure is not limited thereto.

Block 704: the UE 1 determines that there does not exist at least one available resource in the semi-persistent resources according to the resource indication information when it needs to transmit uplink data.

Block 705: the UE 1 transmits a scheduling request to the base station for an uplink resource.

In this embodiment, the UE 1 receives again the resource indication information while or after transmitting the scheduling request, and determines that there still does not exist at least one available resource in the semi-persistent resources according to the resource indication information, and the method further includes:

Block 706: the base station transmits disable information to the UE 2 disabling to use the semi-persistent resources;

in this embodiment, the UE 1 may determine a semi-persistent resource that has been allocated to the UE 2 as the transmission resource, and furthermore, according to the SR, the base station may transmit indication to the UE 2 disabling to use the semi-persistent resources on a TTI or a subframe corresponding to the transmission resource.

Block 707: the UE 1 transmits the uplink data by using the transmission resource at the TTI or the subframe corresponding to the transmission resource.

Figure 8:
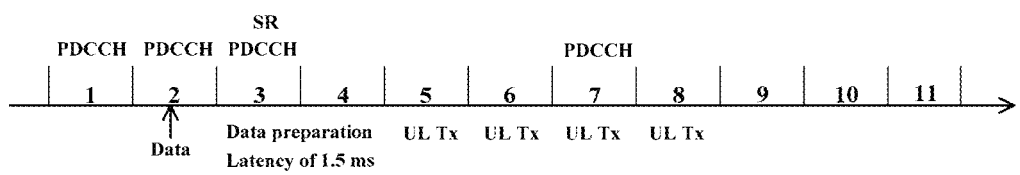
FIG. 8 is a further exemplary diagram of receiving a PDCCH and transmitting uplink data of Embodiment 1 of this disclosure.

FIG. 8 is a further exemplary diagram of receiving a PDCCH and transmitting uplink data of the embodiment of this disclosure. As shown in FIG. 8, a UE 1 is preconfigured with the semi-persistent resources at each subframe (it may also be a TTI, and following description shall be given by taking a subframe as an example), and receives PDCCHs containing the resource indication information at each subframe. Taking that uplink data arrives at an n-th subframe (n=2 as shown in FIG. 8) as an example, a PDCCH containing the resource indication information has been received at an (n−1)-th subframe, which indicates that there exists no available semi-persistent resource at an (n+3)-th subframe or an (n+4)-th subframe, and the UE 1 will transmit an SR at an (n+1)-th subframe.

Furthermore, if the UE 1 learns in or after transmitting the SR (usually at the (n+1)-th subframe) via the indication of the base station (such as a PDCCH received at the (n+1)-th subframe) that there still does not exist at least one available semi-persistent resource in a subsequent subframe (taking that processing latency of the UE is 1.5 ms as an example, it is usually an (n+4)-th subframe or an (n+5)-th subframe), the UE 1 will directly transmit the uplink data by using semi-persistent resources of an (n+T)-th subframe (taking that processing latency of both the UE and the base station is 1.5 ms as an example, such as T=6) allocated for a UE 2.

And according to the SR transmitted by the UE 1, and at an (n+T−1)-th subframe, the base station will transmit indication to the UE 2 disabling to transmit uplink data (such as a PDCCH of a 7th subframe shown in FIG. 8), hence, the UE 2 does not transmit uplink data at the (n+T)-th subframe, its uplink grants are disabled, the semi-persistent resources of the (n+T)-th subframe are automatically returned to the UE 1 for use, and the UE 1 may transmit uplink data at the (n+T)-th subframe (such as an 8th subframe shown in FIG. 8).

Thus, in the embodiment of this embodiment, not only the semi-persistent resources configured for the UE 1 may be temporally allocated for the UE 2 and indicated dynamically to the UE 1 via the resource indication information, but also the semi-persistent resources temporally allocated for the UE 2 may be recycled via the disable information.

The process of this disclosure is illustrated above; however, this disclosure is not limited thereto. For example, an order of execution of the blocks or steps shown in the figures is not limited thereto and may be adjusted according to an actual situation; furthermore, other blocks or steps may be added, or one or more of the blocks or steps may be omitted or combined.

The resource indication information and the disable information shall be illustrated below.

In this embodiment, the resource indication information and/or the disable information may be carried by a PDCCH, the PDCCH including a first field indicating whether a semi-persistent resource of the UE 1 at a first predefined time is available, and/or a second field indicating whether the UE 2 is permitted to transmit the uplink data at a second predefined time.

For example, the first predefined time may be a time to which a third or a fourth subframe after the UE 1 receives the PDCCH corresponds, or a third or a fourth TTI, and the second predefined time may be a time to which a first subframe after the UE 2 receives the PDCCH corresponds, or a first TTI.

In this embodiment, a format of downlink control information (DCI) of the PDCCH is 0 or 4, and all bits of a resource block assignment and hopping resource allocation field are set to be 1.

Following description shall be given by taking that the PDCCH includes the first field and the second field as an example. However, this disclosure is not limited thereto, and it may include the first field, but does not include the second field, or may include the second field, but does not include the first field.

In one implementation, for the format 0 of the DCI of the PDCCH (DCI format 0), when the following conditions are satisfied, the PDCCH is used to indicate availability of uplink resources of the UE; otherwise, the PDCCH is indicative of the legacy DCI format 0.

Table 1 schematically shows DCI format 0 of the embodiment of this disclosure.

TABLE 1

......
-Carrier indicator
  -0 or 3 bits, definition of the field being identical to that in an existing protocol.
-Flag for format0/format1A differentiation
  -1 bit, definition of the field being identical to that in an existing protocol.
-Frequency hopping flag
  -1 bit, definition of the field being identical to that in an existing protocol.
\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*
DCI format 0 is used to indicate availability of the uplink resources when and only when cyclic redundancy check (CRC) of format 0 is scrambled with a cell radio network temporary identifier (C-RNTI) and all the remaining fields are set as follows:
\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*
-Resource block assignment and hopping resource allocation
  -$\lceil \log_2 (N_{RB}^{UL} (N_{RB}^{UL}+1)/2) \rceil$ bits; where, all bits are set to be 1.
-Forbid next UL Tx (i.e., the second field)
  -1 bit; this field is used to indicate whether uplink data of the UE at a next TTI (or a subframe) may be transmitted. "1" denotes transmission of the uplink data of the UE at the next TTI (or the subframe) is disabled, and "0" denotes transmission of the uplink data (if any) of the UE at the next TTI (or the subframe) is permitted.
-SPS resource availability (i.e., the first field)
  -3 bits; this field is used to indicate availability of an SPS resource of the UE at a third TTI (or a subframe) and/or a fourth TTI (or a subframe) after a current TTI. Six cases that may be denoted are as shown in Table 3, for example.
-All remained bits in format 0 corresponding to the PDSCH codeword are set to be 0.
......

In another implementation, for the format 4 of the DCI of the PDCCH (DCI format 4), when the following conditions are satisfied, the PDCCH is used to indicate availability of uplink resources of the UE; otherwise, the PDCCH is indicative of the legacy DCI format 4.

Table 2 schematically shows DCI format 4 of the embodiment of this disclosure.

TABLE 2

......
Carrier indicator
 –0 or 3 bits, definition of the field being identical to that in an existing protocol.
*********************************************************
When and only when CRC of format 4 is scrambled with a C-RNTI and remained fields are set as follows, DCI format 4 is used to indicate availability of uplink resources.
*********************************************************
Resource block assignment and hopping resource allocation $$-\max\left(\lceil\log_2(N_{RB}^{UL}(N_{RB}^{UL}+1)/2)\rceil, \left\lceil\log_2\left(\left(\begin{array}{c}\lceil N_{RB}^{UL}/P+1\rceil\\ 4\end{array}\right)\right)\right\rceil\right)$$

bits; where, all bits are set to be 1.
Forbid next UL Tx (i.e., the second field)
 –1 bit; this field is used to indicate whether uplink data of the UE at a next TTI (or a subframe) may be transmitted. "1" denotes transmission of the uplink data of the UE at the next TTI (or the subframe) is disabled, and "0" denotes transmission of the uplink data (if any) of the UE at the next TTI (or the subframe) is permitted.
SPS resource availability (i.e., the first field)
 –3 bits; this field is used to indicate availability of an SPS resource of the UE at a third TTI (or a subframe) and/or a fourth TTI (or a subframe) after a current TTI. Six cases that may be denoted are as shown in Table 3, for example.
All remained bits in format 4 corresponding to the PDSCH codeword are set to be 0.
......

Table 3 schematically shows meanings of the SPS resource availability fields in tables 1 and 2, taking that the UE receives the PDCCH at an m-th subframe as an example.

TABLE 3

| Indices | Resource availability of an (m + 3)-th subframe | Resource availability of an (m + 4)-th subframe |
| --- | --- | --- |
| 0 | Undefined | Available |
| 1 | Undefined | Unavailable |
| 2 | Available | Unavailable |
| 3 | Unavailable | Available |
| 4 | Available | Available |
| 5 | Unavailable | Unavailable |

It should be noted that the resource indication information and/or the disable information in this disclosure is/are illustrated above by taking a PDCCH as an example. However, this disclosure is not limited thereto, and other manners may be used for indication.

It can be seen from the above embodiment that the UE receives the resource indication information indicating availability the semi-persistent resources transmitted by the base station, and transmits uplink data by using available resources when the uplink data need to be transmitted and there exist the available resources. Hence, not only latency of the uplink data may be reduced outstandingly, but also the semi-persistent resources may be allocated to other UEs with no waste of semi-persistent resources as much as possible, thereby improving resource utilization efficiency and transmission latency performance of the UE.

Embodiment 2

The embodiment of this disclosure provides an uplink data transmission method for latency reduction, which shall be described from a base station side, with contents identical to those in Embodiment 1 being not going to be described herein any further.

Figure 9:
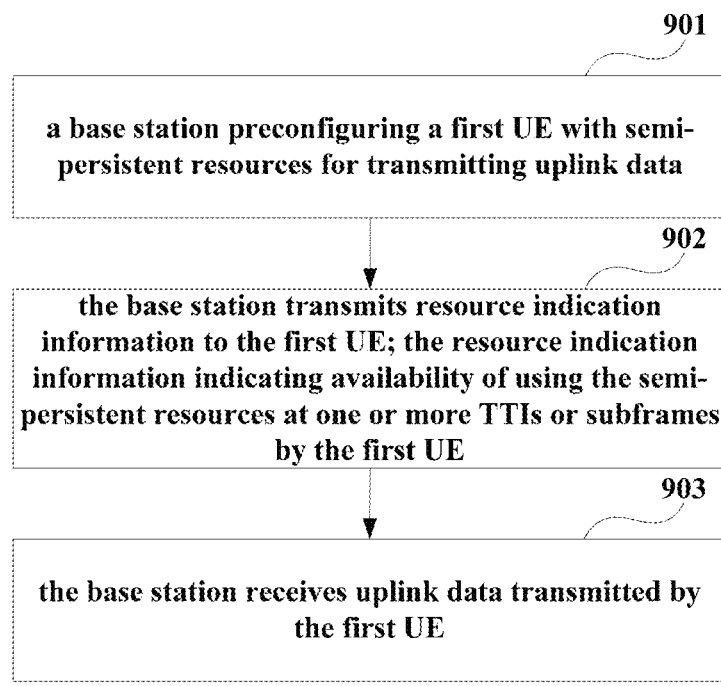
FIG. 9 is a flowchart of the uplink data transmission method for latency reduction of Embodiment 2 of this disclosure.

FIG. 9 is a flowchart of the uplink data transmission method for latency reduction of the embodiment of this disclosure. As shown in FIG. 9, the uplink data transmission method includes:

Block 901: the base station preconfiguring a first UE with semi-persistent resources for transmitting uplink data.

Block 902: the base station transmits resource indication information to the first UE; the resource indication information indicating availability of using the semi-persistent resources at one or more TTIs or subframes by the first UE; and Block 903: the base station receives uplink data transmitted by the first UE.

In this embodiment, the base station may periodically or aperiodically transmit the resource indication information to the first UE, such as transmitting the resource indication information at every TTI, or transmitting the resource indication information at every multiple TTIs; however, this disclosure is not limited thereto.

In this embodiment, the semi-persistent resources may be preconfigured as being unavailable, and the resource indication information indicates that one or more of the semi-persistent resources is/are available for the first UE; alternatively, the semi-persistent resources may be preconfigured as being available, and the resource indication information indicates that one or more of the semi-persistent resources is/are unavailable for the first UE.

Figure 10:
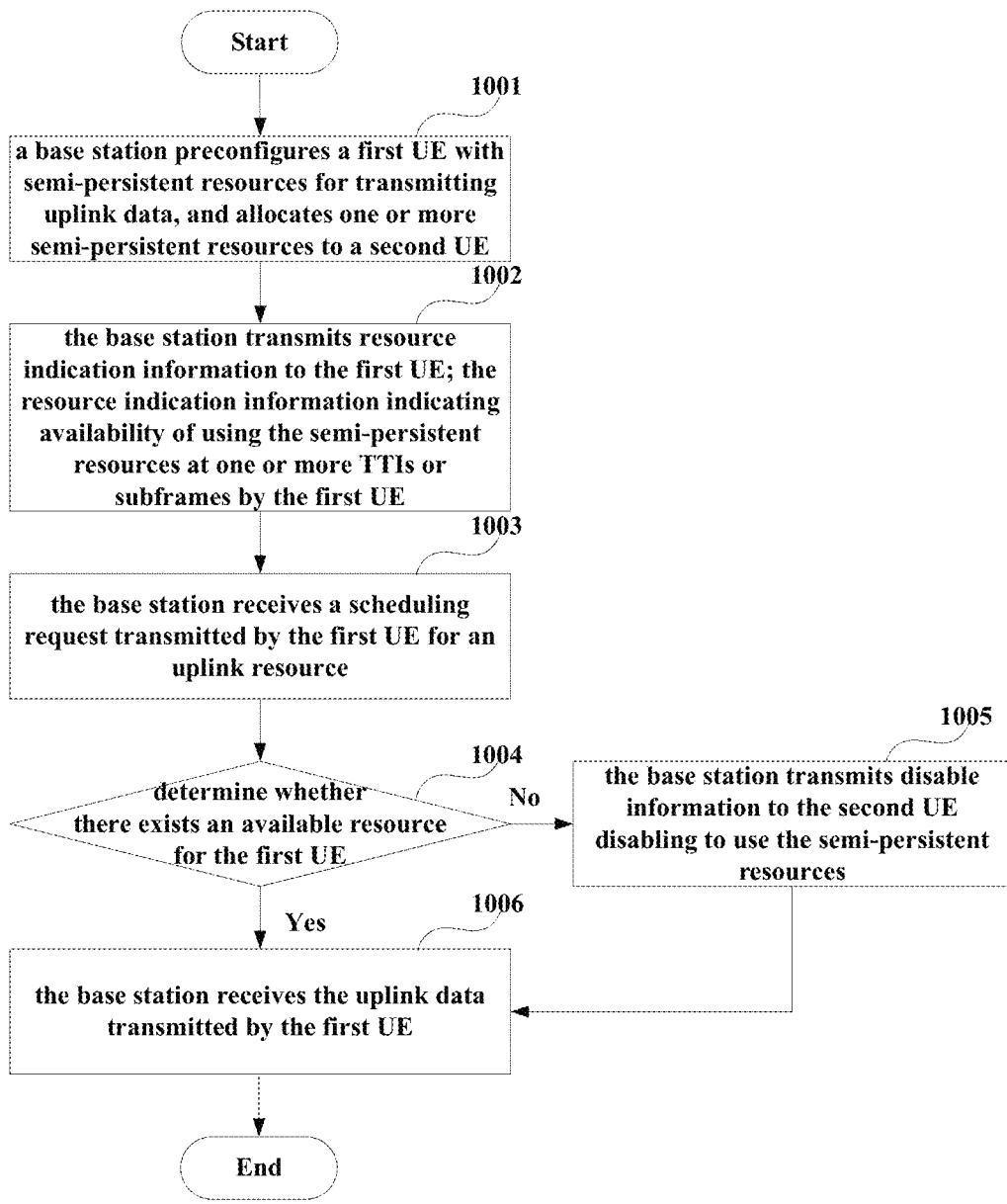
FIG. 10 is another flowchart of the uplink data transmission method for latency reduction of Embodiment 2 of this disclosure.

FIG. 10 is another flowchart of the uplink data transmission method for latency reduction of the embodiment of this disclosure. As shown in FIG. 10, the uplink data transmission method includes:

Block 1001: the base station preconfigures a first UE with semi-persistent resources for transmitting uplink data, and allocates one or more semi-persistent resources to a second UE.

Block 1002: the base station transmits resource indication information to the first UE; the resource indication information indicating availability of using the semi-persistent resources at one or more TTIs or subframes by the first UE.

As shown in FIG. 10, the method may further include:

Block 1003: the base station receives a scheduling request transmitted by the first UE for an uplink resource.

Block 1004: the base station determines whether there exists an available resource for the first UE, and block 1006 is executed when there exists an available resource, and block 1005 is executed when there exists no available resource;

in this embodiment, the base station may determine whether there exists an available resource for the first UE according to the resource indication information transmitted to the first UE.

Block 1005: the base station transmits disable information to the second UE disabling to use the semi-persistent resources;

for example, UE 2 is disabled to use semi-persistent resources at a next TTI.

Block 1006: the base station receives the uplink data transmitted by the first UE.

It can be seen from the above embodiment that the base station preconfigures the first UE with the semi-persistent resources for transmitting uplink data, and transmits the resource indication information to the first UE; the resource indication information indicates availability of using the semi-persistent resources by the first UE. Hence, not only latency of the uplink data may be reduced outstandingly, but also the semi-persistent resources may be allocated to other UEs with no waste of semi-persistent resources as much as possible, thereby improving resource utilization efficiency and transmission latency performance of the UE.

Embodiment 3

The embodiment of this disclosure provides an uplink data transmission apparatus for latency reduction, configured in a first UE; the first UE is preconfigured with semi-persistent resources for transmitting uplink data. This embodiment corresponds to the uplink data transmission method for latency reduction described in Embodiment 1, with identical contents being not going to be described herein any further.

Figure 11:
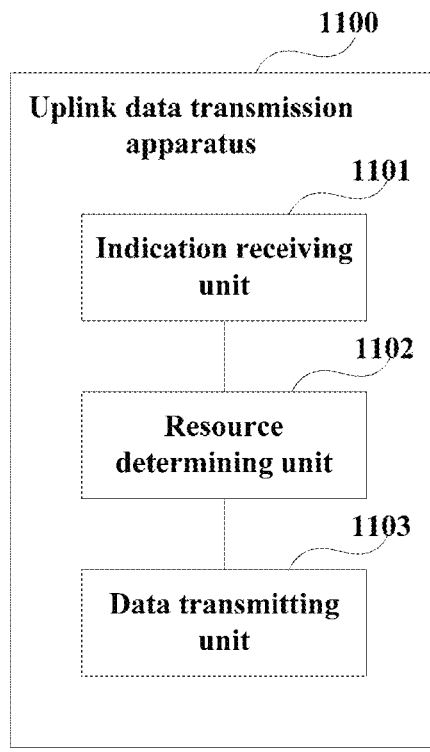
FIG. 11 is a schematic diagram of the uplink data transmission apparatus for latency reduction of Embodiment 3 of this disclosure.

FIG. 11 is a schematic diagram of the uplink data transmission apparatus for latency reduction of the embodiment of this disclosure. As shown in FIG. 11, the uplink data transmission apparatus 1100 includes:

an indication receiving unit 1101 configured to receive resource indication information transmitted by a base station; the resource indication information indicates availability of using the semi-persistent resources at one or more TTIs or subframes by the first UE;

a resource determining unit 1102 configured to determine a transmission resource from the semi-persistent resources according to the resource indication information when uplink data is needed to be transmitted; and a data transmitting unit 1103 configured to transmit the uplink data by using the transmission resource at a TTI or a subframe corresponding to the transmission resource.

In this embodiment, the resource determining unit 1102 may determine whether there exists at least one available resource in the semi-persistent resources according to the resource indication information, and determine a first available resource as the transmission resource when there exists an available resource.

Figure 12:
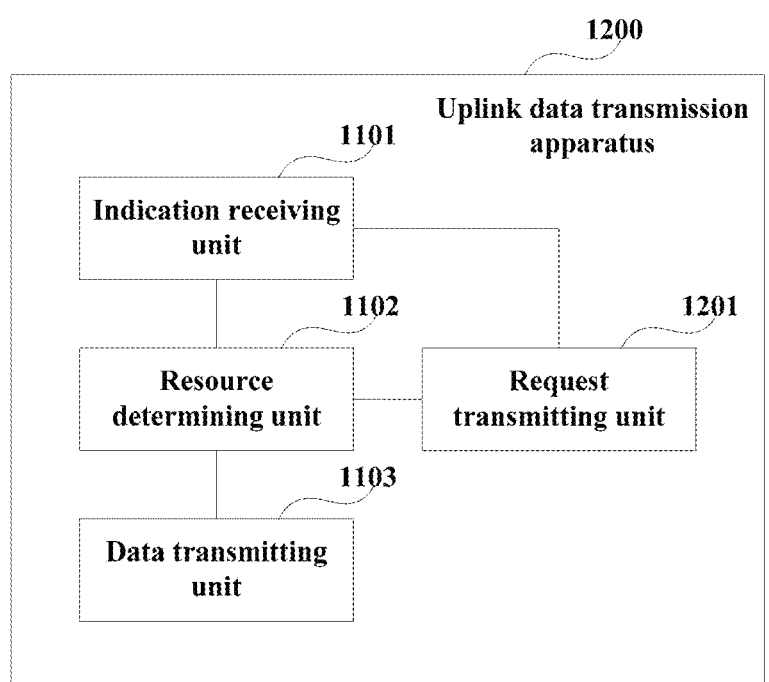
FIG. 12 is another schematic diagram of the uplink data transmission apparatus for latency reduction of Embodiment 3 of this disclosure.

FIG. 12 is another schematic diagram of the uplink data transmission apparatus for latency reduction of the embodiment of this disclosure. As shown in FIG. 12, the uplink data transmission apparatus 1200 includes an indication receiving unit 1101, a resource determining unit 1102 and a data transmitting unit 1103, as described above.

As shown in FIG. 12, the uplink data transmission apparatus 1200 may further include:

a request transmitting unit 1201 configured to transmit a scheduling request to the base station for an uplink resource when the uplink data is needed to be transmitted and there exists no available resource.

In this embodiment, the indication receiving unit 1101 may further be configured to receive again the resource indication information while or after the request transmitting unit 1201 transmits the scheduling request; and the resource determining unit 1102 may further be configured to determine the first available resource as the transmission resource when there exists an available resource after the request transmitting unit 1201 transmits the scheduling request.

In this embodiment, one or more semi-persistent resources configured for the first UE may be allocated to a second UE for use. And the resource determining unit 1102 may further be configured to determine a semi-persistent resource that has been allocated to the second UE as the transmission resource when there exists no available resource and after the request transmitting unit 1201 transmits the scheduling request.

The semi-persistent resource that has been allocated to the second UE may be determined by a time needed by the base station in receiving the scheduling request and disabling the second UE to use the semi-persistent resource. For example, the transmission resource is a semi-persistent resource to which a fifth subframe or a fifth TTI after the request transmitting unit 1201 transmits the scheduling request corresponds.

In this embodiment, the resource indication information may be carried by a PDCCH, the PDCCH including a first field indicating whether a semi-persistent resource of the first UE at a first predefined time is available. For example, the first predefined time is a time to which a third or a fourth subframe after the first UE receives the physical downlink control channel corresponds, or a third or a fourth TTI.

In this embodiment, the PDCCH may further include: a second field indicating whether the second UE is permitted to transmit the uplink data at a second predefined time. For example, the second predefined time is a time to which a first subframe after the second UE receives the physical downlink control channel corresponds, or a first TTI.

In this embodiment, a DCI format of the PDCCH may be 0 or 4, and all bits of a resource block assignment and a hopping resource allocation field in the PDCCH are set to be 1.

The embodiment of this disclosure further provides a UE, configured with the above uplink data transmission apparatus 1100 or 1200.

Figure 13:
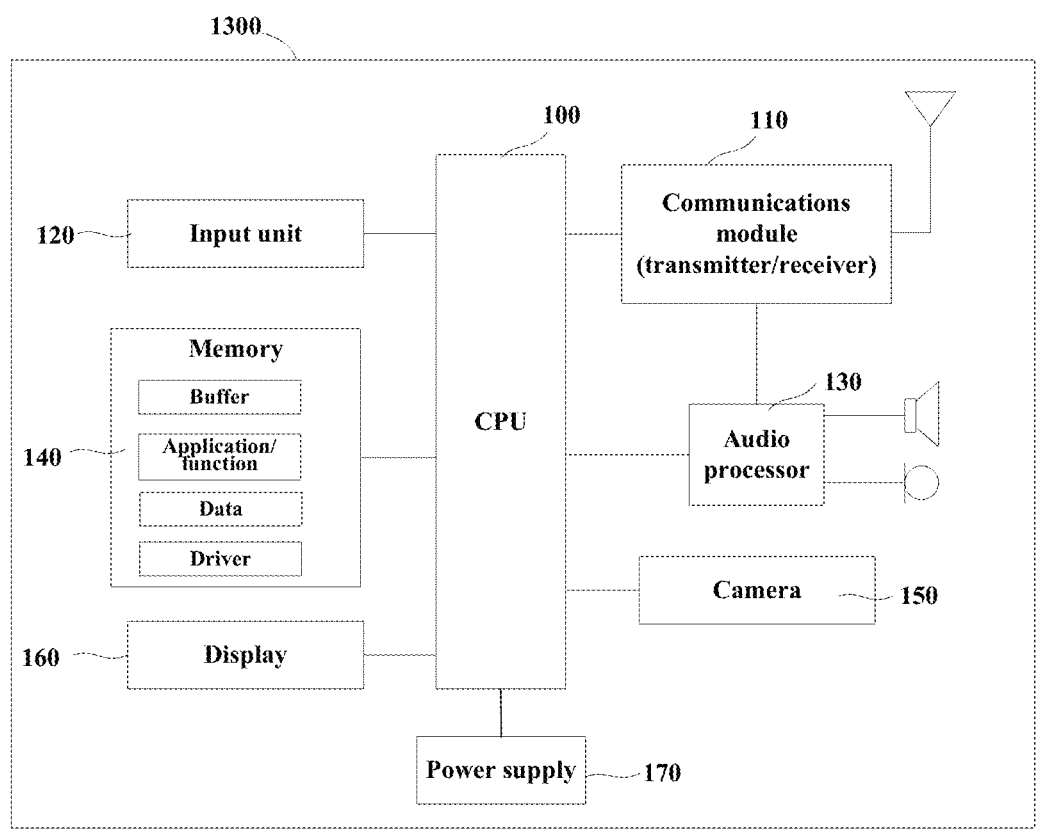
FIG. 13 is a schematic diagram of the UE of Embodiment 3 of this disclosure.

FIG. 13 is a schematic diagram of a structure of the UE of the embodiment of this disclosure. As shown in FIG. 13, the UE 1300 may include a central processing unit 100 and a memory 140, the memory 140 being coupled to the central processing unit 100. It should be noted that this figure is illustrative only, and other types of structures may also be used, so as to supplement or replace this structure and achieve a telecommunications function or other functions.

In an implementation, the functions of the uplink data transmission apparatus 1100 or 1200 may be integrated into the central processing unit 100. The central processing unit 100 may be configured to carry out the uplink data transmission method described in Embodiment 1.

In another implementation, the uplink data transmission apparatus 1100 or 1200 and the central processing unit 100 may be configured separately. For example, the uplink data transmission apparatus 1100 or 1200 may be configured as a chip connected to the central processing unit 100, with its functions being realized under control of the central processing unit 100.

As shown in FIG. 13, the UE 1300 may further include a communications module 110, an input unit 120, an audio processor 130, a memory 140, a camera 150, a display 160 and a power supply 170. Functions of the above components are similar to those in the relevant art, and shall not be described herein any further. It should be noted that the UE 1300 does not necessarily include all the parts shown in FIG. 13, and the above components are not necessary; and furthermore, the UE 1300 may include parts not shown in FIG. 13, and the relevant art may be referred to.

It can be seen from the above embodiment that the UE receives the resource indication information indicating availability the semi-persistent resources transmitted by the base station, and transmits uplink data by using available resources when the uplink data need to be transmitted and there exist the available resources. Hence, not only latency of the uplink data may be reduced outstandingly, but also the semi-persistent resources may be allocated to other UE with no waste of semi-persistent resources as much as possible, thereby improving resource utilization efficiency and transmission latency performance of the UE.

Embodiment 4

The embodiment of this disclosure provides an uplink data transmission apparatus for latency reduction, configured in a base station. This embodiment corresponds to the uplink data transmission method for latency reduction described in Embodiment 2, with identical contents being not going to be described herein any further.

Figure 14:
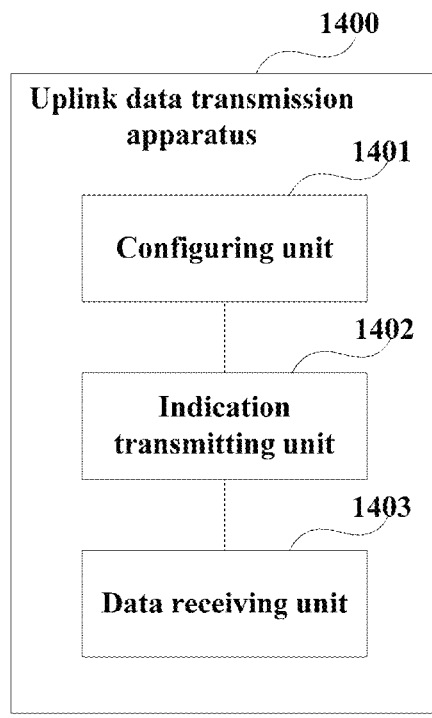
FIG. 14 is a schematic diagram of the uplink data transmission apparatus for latency reduction of Embodiment 4 of this disclosure.

FIG. 14 is a schematic diagram of the uplink data transmission apparatus for latency reduction of the embodiment of this disclosure. As shown in FIG. 14, the uplink data transmission apparatus 1400 includes:

a configuring unit 1401 configured to configure a first UE with semi-persistent resources for transmitting uplink data;

an indication transmitting unit 1402 configured to transmit resource indication information to the first UE; the resource indication information indicates availability of using the semi-persistent resources at one or more TTIs or subframes by the first UE; and a data receiving unit 1403 configured to receive uplink data transmitted by the first UE.

In this embodiment, the indication transmitting unit 1402 may periodically or aperiodically transmit the resource indication information to the first UE.

In this embodiment, the semi-persistent resources may be preconfigured as being unavailable, and the resource indication information indicates that one or more of the semi-persistent resources is/are available for the first UE; alternatively, the semi-persistent resources may be preconfigured as being available, and the resource indication information indicates that one or more of the semi-persistent resources is/are unavailable for the first UE.

Figure 15:
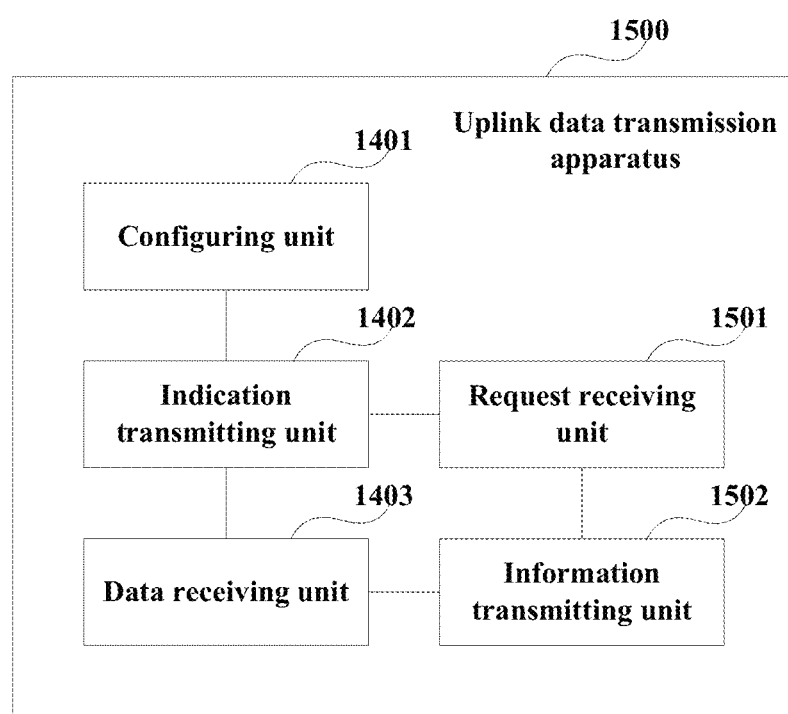
FIG. 15 is another schematic diagram of the uplink data transmission apparatus for latency reduction of Embodiment 4 of this disclosure.

FIG. 15 is another schematic diagram of the uplink data transmission apparatus for latency reduction of the embodiment of this disclosure. As shown in FIG. 15, the uplink data transmission apparatus 1500 includes a configuring unit 1401, an indication transmitting unit 1402 and a data receiving unit 1403, as described above.

As shown in FIG. 15, the uplink data transmission apparatus 1500 may further include:

a request receiving unit 1501 configured to receive a scheduling request transmitted by the first UE for an uplink resource.

In this embodiment, the configuring unit 1401 may further allocate one or more of the semi-persistent resources configured for the first UE to a second UE.

As shown in FIG. 15, the uplink data transmission apparatus 1500 may further include:

an information transmitting unit 1502 configured to transmit disable information to the second UE disabling to use the semi-persistent resources when the scheduling request is received and there exists no available resource for the first UE.

The embodiment of this disclosure further provides a base station, configured with the above uplink data transmission apparatus 1400 or 1500.

Figure 16:
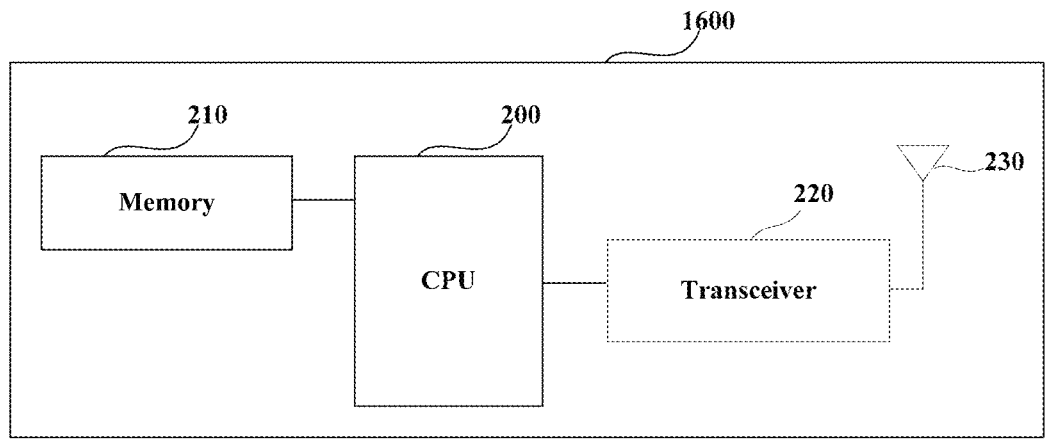
FIG. 16 is a schematic diagram of the base station of Embodiment 4 of this disclosure.

FIG. 16 is a schematic diagram of a structure of the base station of the embodiment of this disclosure. As shown in FIG. 16, the base station 1600 may include a central processing unit (CPU) 200 and a memory 210, the memory 210 being coupled to the central processing unit 200. The memory 210 may store various data, and furthermore, it may store a program for information processing, and execute the program under control of the central processing unit 200.

The functions of the uplink data transmission apparatus 1400 or 1500 may be integrated into the central processing unit 200, and the central processing unit 200 may be configured to carry out the uplink data transmission method described in Embodiment 2.

Furthermore, as shown in FIG. 16, the base station 1600 may include a transceiver 220, and an antenna 230, etc. Functions of the above components are similar to those in the relevant art, and shall not be described herein any further. It should be noted that the base station 1600 does not necessarily include all the parts shown in FIG. 16, and furthermore, the base station 1600 may include parts not shown in FIG. 16, and the relevant art may be referred to.

It can be seen from the above embodiment that the base station preconfigures the first UE with the semi-persistent resources for transmitting uplink data, and transmits the resource indication information to the first UE; the resource indication information indicates availability of using the semi-persistent resources by the first UE. Hence, not only latency of the uplink data may be reduced outstandingly, but also the semi-persistent resources may be allocated to other UE with no waste of semi-persistent resources as much as possible, thereby improving resource utilization efficiency and transmission latency performance of the UE.

Embodiment 5

The embodiment of this disclosure provides a communications system, with contents identical to those in embodiments 1-4 being not going to be described herein any further.

Figure 17:
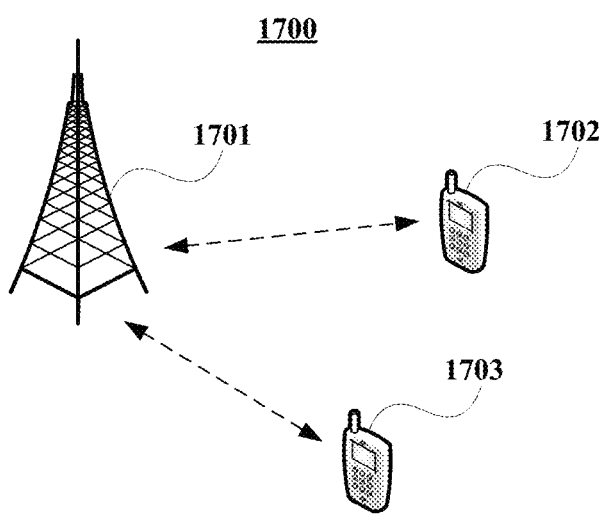
FIG. 17 is a schematic diagram of the communications system of Embodiment 5 of this disclosure.

FIG. 17 is a schematic diagram of the communications system of the embodiment of this disclosure. As shown in FIG. 17, the communications system 1700 includes a base station 1701 and a first UE 1702.

The base station 1701 preconfigures the first UE 1702 with semi-persistent resources for transmitting uplink data.

In this embodiment, the base station 1701 transmits resource indication information to the first UE 1702, the resource indication information indicating availability of using the semi-persistent resources at one or more TTIs or subframes by the first UE 1702, and receives uplink data transmitted by the first UE 1702.

The first UE 1702 determines a transmission resource from the semi-persistent resources according to the resource indication information when uplink data is needed to be transmitted, and transmits the uplink data by using the transmission resource at a TTI or a subframe corresponding to the transmission resource.

In this embodiment, the first UE 1702 is configured to determine whether there exists at least one available resource in the semi-persistent resources according to the resource indication information, and determine a first available resource as the transmission resource when there exists an available resource.

As shown in FIG. 17, the communications system 1700 may further include a second UE 1703, and the base station 1701 allocates one or more of the semi-persistent resources configured for the first UE 1702 to the second UE 1703.

In this embodiment, the first UE 1702 is further configured to transmit a scheduling request to the base station for an uplink resource when there exists no available resource, and determine a semi-persistent resource that has been allocated to the second UE 1703 as the transmission resource.

The base station 1701 is further configured to transmit disable information to the second UE 1703 disabling to use the semi-persistent resource when the scheduling request is received and there exists no available resource for the first UE 1702.

And the second UE 1703 is further configured to not to use the semi-persistent resource at a TTI or a subframe corresponding to the transmission resource according to the disable information.

An embodiment of the present disclosure provides a computer readable program, which, when executed in a UE, will cause a computer unit to carry out the uplink data transmission method for latency reduction described in Embodiment 1 in the UE.

An embodiment of the present disclosure provides a computer storage medium, including a computer readable program, which will cause a computer unit to carry out the uplink data transmission method for latency reduction described in Embodiment 1 in a UE.

An embodiment of the present disclosure provides a computer readable program, which, when executed in a base station, will cause a computer unit to carry out the uplink data transmission method for latency reduction described in Embodiment 2 in the base station.

An embodiment of the present disclosure provides a computer storage medium, including a computer readable program, which will cause a computer unit to carry out the uplink data transmission method for latency reduction described in Embodiment 2 in a base station.

The above apparatuses and methods of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

One or more functional blocks and/or one or more combinations of the functional blocks in the drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof. And they may also be realized as a combination of computing equipment, such as a combination of a DSP and a microprocessor, multiple processors, one or more microprocessors in communications combination with a DSP, or any other such configuration.

The present disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

What is claimed is:

1. An uplink data transmission apparatus for latency reduction, configured in a first user equipment (UE);
the uplink data transmission apparatus comprises:
a memory that stores a plurality of instructions; and
processor circuitry that couples to the memory and is configured to execute the plurality of instructions to:
receive resource indication information transmitted by a base station;

wherein the base station preconfigures semi-persistent resources for the first UE and activates the semi-persistent resources, the semi-persistent resources being available, wherein the base station indicates that the first UE does not use one or more of the semi-persistent resources at one or more transmission time intervals (TTIs) or subframes by using the resource indication information;

wherein the resource indication information is carried by a physical downlink control channel, the physical downlink control channel comprising a first field indicating the first UE at a first predefined time that the semi-persistent resources is unavailable, determine a transmission resource from the semi-persistent resources according to whether the UE received the resource indication information from the base station when uplink data is needed to be transmitted; and transmit the uplink data by using the transmission resource at a TTI or a subframe corresponding to the transmission resource.

2. The uplink data transmission apparatus according to claim 1, wherein the processor circuitry is further configured to determine whether there exists at least one available resource in the semi-persistent resources according to the resource indication information, and determine a first available resource as the transmission resource when there exists an available resource.

3. The uplink data transmission apparatus according to claim 2, wherein the processor circuitry is further configured to transmit a scheduling request to the base station for an uplink resource when the uplink data is needed to be transmitted and there exists no available resource.

4. The uplink data transmission apparatus according to claim 3, wherein the processor circuitry is further configured to receive again the resource indication information while or after the processor circuitry transmits the scheduling request; and the processor circuitry is further configured to determine the first available resource as the transmission resource when there exists an available resource after the processor circuitry transmits the scheduling request.

5. The uplink data transmission apparatus according to claim 3, wherein one or more semi-persistent resources configured for the first UE is/are allocated to a second UE for use; and the processor circuitry is further configured to determine a semi-persistent resource that has been allocated to the second UE as the transmission resource when there exists no available resource and after the processor circuitry transmits the scheduling request.

6. The uplink data transmission apparatus according to claim 5, wherein the semi-persistent resource that has been allocated to the second UE is determined by a time needed by the base station in receiving the scheduling request and disabling the second UE to use the semi-persistent resource.

7. The uplink data transmission apparatus according to claim 5, wherein the transmission resource is a semi-persistent resource to which a fifth subframe or a fifth TTI after the processor circuitry transmits the scheduling request corresponds.

8. The uplink data transmission apparatus according to claim 1, wherein the first predefined time is a time to which a third or a fourth subframe after the first UE receives the physical downlink control channel corresponds, or a third or a fourth TTI.

9. The uplink data transmission apparatus according to claim 1, wherein the physical downlink control channel further comprises: a second field indicating whether the second UE is permitted to transmit the uplink data at a second predefined time.

10. The uplink data transmission apparatus according to claim 9, wherein the second predefined time is a time to which a first subframe after the second UE receives the physical downlink control channel corresponds, or a first TTI.

11. The uplink data transmission apparatus according to claim 1, wherein all bits of a resource block assignment and a hopping resource allocation field in the physical downlink control channel are set to be 1.

12. An uplink data transmission apparatus for latency reduction, configured in a base station, the uplink data transmission apparatus comprising:
a memory that stores a plurality of instructions; and
processor circuitry that couples to the memory and is configured to execute the plurality of instructions to:
preconfigure first user equipment (UE) with semi-persistent resources for transmitting uplink data and activate the semi-persistent resources, the semi-persistent resources being available,
transmit resource indication information to the first UE indicating that the first UE does not use one or more of the semi-persistent resources at one or more transmission time intervals (TTIs) or subframes by using the resource indication information;
wherein the resource indication information is carried by a physical downlink control channel, the physical downlink control channel comprising a first field indicating the first UE at a first predefined time that the semi-persistent resources is unavailable,
wherein the UE determines a transmission resource from the semi-persistent resources according to whether the UE received the resource indication information from the base station when uplink data is needed to be transmitted; and
receive uplink data transmitted by the first UE.

13. The uplink data transmission apparatus according to claim 12, wherein the semi-persistent resources are preconfigured as being unavailable, and the resource indication information indicates that one or more of the semi-persistent resources is/are available for the first UE; or,
the semi-persistent resources are preconfigured as being available, and the resource indication information indicates that one or more of the semi-persistent resources is/are unavailable for the first UE.

14. The uplink data transmission apparatus according to claim 12, wherein the processor circuitry is further configured to receive a scheduling request transmitted by the first UE for an uplink resource.

15. The uplink data transmission apparatus according to claim 14, wherein the processor circuitry is further configured to allocate one or more of the semi-persistent resources to a second UE, and the processor circuitry is further configured to transmit disable information to the second UE disabling to use the semi-persistent resources when the scheduling request is received and there exists no available resource for the first UE.

16. A communications system, comprising:
a base station configured to:
preconfigure a first user equipment (UE) with semi-persistent resources for transmitting uplink data and activate the semi-persistent resources, the semi-persistent resources being available,
transmit resource indication information to the first UE, the resource indication information indicating the first UE does not use one or more of the semi-persistent resources at one or more transmission time intervals (TTIs) or subframes by using the resource indication information,
wherein the resource indication information is carried by a physical downlink control channel, the physical downlink control channel comprising a first field indicating the first UE at a first predefined time that the semi-persistent resources is unavailable, wherein, the UE determines a transmission resource from the semi-persistent resources according to whether the UE received the resource indication information from the base station when uplink data is needed to be transmitted; and
receive uplink data transmitted by the first UE, and
the first UE configured to determine a transmission resource from the semi-persistent resources according to the resource indication information from the base station when uplink data is needed to be transmitted, and transmit the uplink data by using the transmission resource at a TTI or a subframe corresponding to the transmission resource.

17. The communications system according to claim 16, wherein the first UE is configured to determine whether there exists at least one available resource in the semi-persistent resources according to the resource indication information, and determine a first available resource as the transmission resource when there exists an available resource.

18. The communications system according to claim 17, wherein the communications system further comprises:
a second UE configured to be allocated by the base station with one or more of the semi-persistent resources.

19. The communications system according to claim 18, wherein the first UE is further configured to transmit a scheduling request to the base station for an uplink resource when there exists no available resource, and determine a semi-persistent resource that has been allocated to the second UE as the transmission resource;
the base station is further configured to transmit disable information to the second UE disabling to use the semi-persistent resource when the scheduling request is received and there exists no available resource for the first UE; and
the second UE is further configured to not to use the semi-persistent resource at a TTI or a subframe corresponding to the transmission resource according to the disable information.

* * * * *